United States Patent
Serrano et al.

(10) Patent No.: US 10,611,352 B2
(45) Date of Patent: Apr. 7, 2020

(54) SENSOR DEVICE AND METHOD FOR CARRYING OUT OR BOOSTING AN AUTONOMOUS BUILD-UP OF BRAKE PRESSURE IN A BRAKING SYSTEM WITH THE AID OF AN ACTIVE BRAKE BOOSTER

(71) Applicant: Robert Bosch GmbH, Stuttgart (DE)

(72) Inventors: David Rubia Serrano, Ludwigsburg (DE); Eduardo Herrera Lopez, South Lyon, MI (US); Manfred Gerdes, Vaihingen/Enz (DE); Peter Ziegler, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 15/316,381

(22) PCT Filed: Apr. 7, 2015

(86) PCT No.: PCT/EP2015/057449
§ 371 (c)(1),
(2) Date: May 30, 2017

(87) PCT Pub. No.: WO2015/188958
PCT Pub. Date: Dec. 17, 2015

(65) Prior Publication Data
US 2017/0259797 A1 Sep. 14, 2017

(30) Foreign Application Priority Data

Jun. 10, 2014 (DE) ........................ 10 2014 211 008

(51) Int. Cl.
*B60T 13/74* (2006.01)
*B60T 8/40* (2006.01)
(Continued)

(52) U.S. Cl.
CPC ............ *B60T 8/4077* (2013.01); *B60T 7/042* (2013.01); *B60T 7/065* (2013.01); *B60T 13/743* (2013.01); *B60T 13/745* (2013.01); *B60T 13/746* (2013.01)

(58) Field of Classification Search
CPC .... B60T 13/143; B60T 13/741; B60T 13/743; B60T 2220/04; B60T 8/4077;
(Continued)

(56) References Cited

U.S. PATENT DOCUMENTS

| 4,531,419 A | 7/1985 | Boetz et al. |
| 2012/0073286 A1* | 3/2012 | Takayama ............. B60T 13/745 60/538 |

(Continued)

FOREIGN PATENT DOCUMENTS

| CN | 102256842 A | 11/2011 |
| CN | 202080259 U * | 12/2011 |

(Continued)

OTHER PUBLICATIONS

International Search Report, dated Sep. 23, 2015, of the corresponding International Application PCT/EP2015/057449 filed Apr. 7, 2015.

*Primary Examiner* — Bradley T King
*Assistant Examiner* — Stephen M Bowes
(74) *Attorney, Agent, or Firm* — Norton Rose Fulbright US LLP; Gerard Messina

(57) ABSTRACT

A sensor device, active brake booster, and method for a braking system, including an active brake booster for carrying out/boosting an autonomous or partially autonomous brake pressure buildup, including an electronic device, which, at least during the autonomous or partially autonomous brake pressure buildup by the active brake booster, is configured, based on at least one deformation variable,
(Continued)

provided externally or established by the sensor device, as to a deformation of the active brake booster, and/or a tensile force which effectuates the deformation and is exerted on a brake pedal, to output at least one activation signal to a warning display device and/or to a warning sound output device and/or at least one control signal to the active brake booster, to control the latter at least for a predefined first time interval into a safety mode or to interrupt the latter at least for a predefined second time interval.

19 Claims, 3 Drawing Sheets

(51) Int. Cl.
*B60T 7/04* (2006.01)
*B60T 7/06* (2006.01)

(58) Field of Classification Search
CPC ...... B60T 8/3265; B60T 7/042; B60T 13/745; B60T 17/22; B60T 17/221; B60T 2270/40
See application file for complete search history.

(56) References Cited

U.S. PATENT DOCUMENTS

| | | | |
|---|---|---|---|
| 2013/0213034 A1* | 8/2013 | Leiber | B60T 7/042 60/534 |
| 2014/0197680 A1* | 7/2014 | Gilles | B60T 8/3275 303/2 |
| 2015/0197229 A1* | 7/2015 | Knechtges | B60T 8/4077 303/3 |

FOREIGN PATENT DOCUMENTS

| | | | |
|---|---|---|---|
| CN | 103547493 A | | 1/2014 |
| CN | 203651739 U | * | 6/2014 |
| DE | 3031643 A1 | | 4/1982 |
| DE | 10327553 A1 | | 1/2005 |
| DE | 102004011622 A1 | | 3/2005 |
| DE | 102006020304 A1 | | 9/2008 |
| DE | 102012220553 A1 | | 5/2014 |
| JP | 2009227103 A | | 10/2009 |

* cited by examiner

SENSOR DEVICE AND METHOD FOR CARRYING OUT OR BOOSTING AN AUTONOMOUS BUILD-UP OF BRAKE PRESSURE IN A BRAKING SYSTEM WITH THE AID OF AN ACTIVE BRAKE BOOSTER

FIELD OF THE INVENTION

The present invention relates to a sensor device for a braking system including an active brake booster configured for carrying out or boosting an autonomous or partially autonomous brake pressure buildup. Likewise, the present invention relates to an active brake booster. In addition, the present invention relates to a method for carrying out or boosting an autonomous brake pressure buildup in a braking system with the aid of an active brake booster.

BACKGROUND INFORMATION

An active brake booster may be understood to be a brake booster configured for carrying out or boosting an autonomous or partially autonomous brake pressure buildup. From the related art, there is a known plurality of active brake boosters such as, for example, electromechanical brake boosters. For example, DE 103 27 553 A1 discusses an electromechanical brake booster including a hollow shaft electric motor and a spindle gear with the aid of which a booster force may be exerted on at least one adjustable piston of a main brake cylinder. DE 30 31 643 A1 also describes a brake booster including an electric motor, which, however, cooperates with the at least one adjustable piston of the respective main brake cylinder via a worm gear and a multi-disk clutch.

SUMMARY OF THE INVENTION

The present invention creates a sensor device for a braking system including an active brake booster configured for carrying out or boosting an autonomous or partially autonomous brake pressure buildup having the features described herein, an active brake booster for a braking system having the features of claim 8 and a method for carrying out or boosting an autonomous or partially autonomous brake pressure buildup in a braking system with the aid of an active brake booster having the features described herein.

The present invention creates reliable options for early detection of a brake pedal blockage during an autonomous or partially autonomous brake pressure buildup in at least one wheel brake cylinder of a braking system. Due to the early detection of the brake pedal blockage, measures may still be carried out promptly with the aid of which a hard stop and/or jamming of an object by the brake pedal is/are preventable. Furthermore, since it is possible to reliably prevent a hard contact between the object and the brake pedal when using the present invention, there is also no need to fear damage to the braking system due to a reaction of the hard contact to the braking system, specifically to the active brake booster. The present invention thus contributes toward an increase in the safety of vehicle occupants, toward an improvement in object protection of objects present in the vehicle and to preservation of braking system components during the autonomous or partially autonomous brake pressure buildup.

During the brake pedal blockage (pedal blockade), which is detectable reliably and promptly with the aid of the present invention, this may be understood to refer to an extension of an object such as a driver's foot, for example, into a gap between the brake pedal and the adjacent vehicle wall component. Since during an autonomous or partially autonomous brake pressure buildup carried out with the aid of the active brake booster, the brake pedal is generally also adjusted (despite not being operated by a driver) so there is traditionally the risk that the extending object might be struck and/or jammed. Furthermore, a tensile force exerted onto the brake pedal by the jammed object and directed against the joint adjustment movement may result in damage to at least one braking system component, in particular damage to the active brake booster. However, these disadvantages may be eliminated with the aid of the present invention.

In an advantageous specific embodiment, the at least one first control signal is outputtable to the active brake booster with the aid of the electronic device, the electronic device additionally being configured to output at least one second control signal to at least one valve of the braking system and/or at least one pump of the braking system during output of the at least one first control signal, the at least one valve and/or the at least one pump being activatable with the aid of the at least one second control signal in such a way that the autonomous brake pressure buildup is boostable with the aid of the at least one valve and/or the at least one pump, at least for the predefined first time interval, or at least being continuable for the predefined second time interval. Thus despite an impairment of the operation of the active brake booster (at least temporarily) triggered with the aid of the at least one first control signal, the autonomous brake pressure buildup may still be carried out reliably.

For example, the electronic device is configured to output at least the at least one activation signal and/or the at least one first control signal, taking into account at least one temporal change of a differential travel between a pedal force transfer component situated on the brake pedal and a booster force transfer component situated in or on the active brake booster as the at least one deformation variable. The possible presence of a brake pedal blockage is then detectable reliably and at an early point in time in particular based on the temporal change of the differential travel.

Alternatively or additionally, the electronic device may also be configured to output at least the at least one activation signal and/or the at least one first control signal, taking into account a comparison of at least the tensile force as the at least one deformation variable with at least one predefined normal value range. In such an analysis of the tensile force, the possible presence of a brake pedal blockage may also be detected reliably and promptly.

The electronic device is optionally configured to establish the at least one normal value range, taking into account at least the differential travel and/or the temporal change of the differential travel. The reliability of the comparison described above may be further increased in this way.

In one advantageous specific embodiment, the electronic device is configured to establish the tensile force itself, taking into account at least one booster force exerted by the active brake booster, a compressive force exerted on at least one adjustable piston of a main brake cylinder of the braking system, a restoring force of at least one spring of the braking system and/or a motor acceleration of a motor of the active brake booster. It is therefore unnecessary to furnish the sensor device or for the braking system equipped with it, with a separate sensor for measuring the tensile force.

Likewise, the electronic device may be configured to establish the differential travel itself taking into account a rotation angle of the motor of the active brake booster measured by a rotation angle sensor, and a rod travel of the pedal force transfer component configured as an input rod, the rod travel being measured by a rod travel sensor. Operation of the sensor device is thus not limited to furnishing the braking system with a differential travel sensor. The number of sensors installed in/on the braking system may therefore be limited due to the advantageous design of the sensor device.

An active brake booster for a braking system which is configured for carrying out or boosting an autonomous or partially autonomous brake pressure buildup and includes such a control also creates the advantages described above.

Likewise, the advantages described here may be implemented by carrying out a corresponding method for carrying out or boosting an autonomous or partially autonomous brake pressure buildup in a braking system with the aid of an active brake booster. This method may be refined according to the specific embodiments of the sensor device described above.

Additional features and advantages of the present invention are explained below with reference to the figures.

DETAILED DESCRIPTION

Figure 1A:
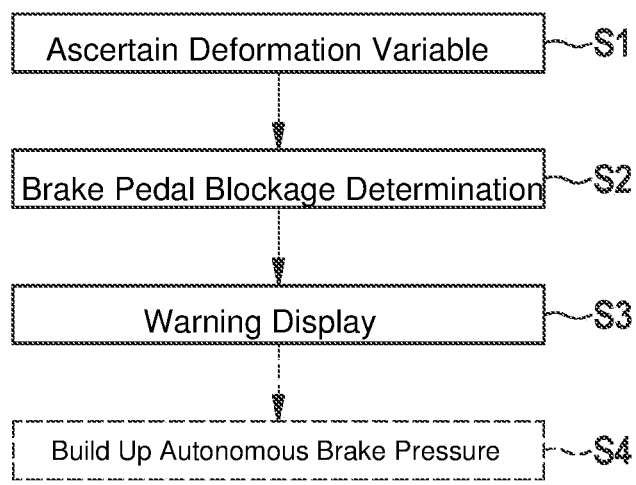
FIGS. 1a, 1b and 1c show a flow chart and coordinate systems for explaining a first specific embodiment of the method for carrying out or boosting an autonomous or partially autonomous brake pressure buildup in a braking system with the aid of an active brake booster.
Figure 1B:
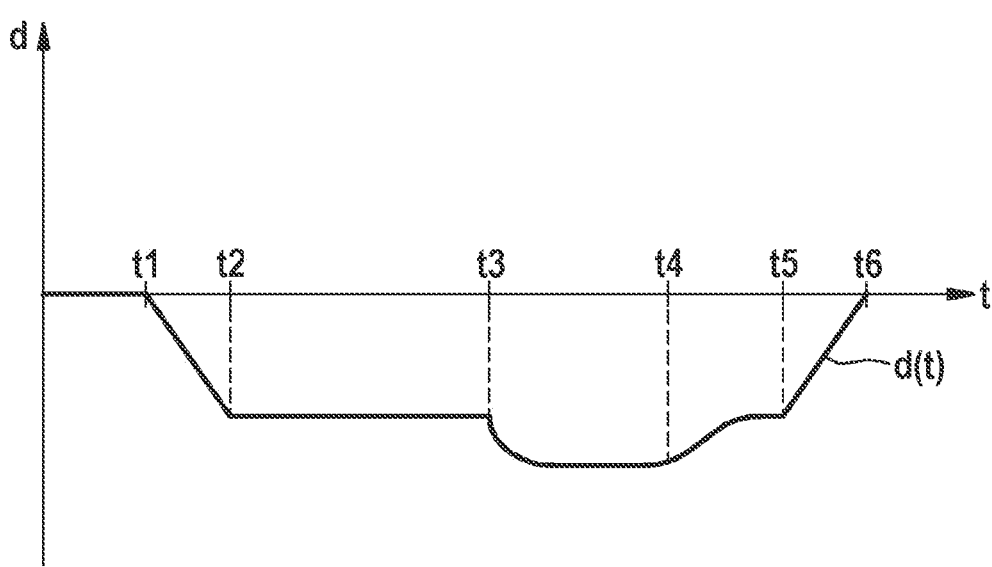
Figure 1C:
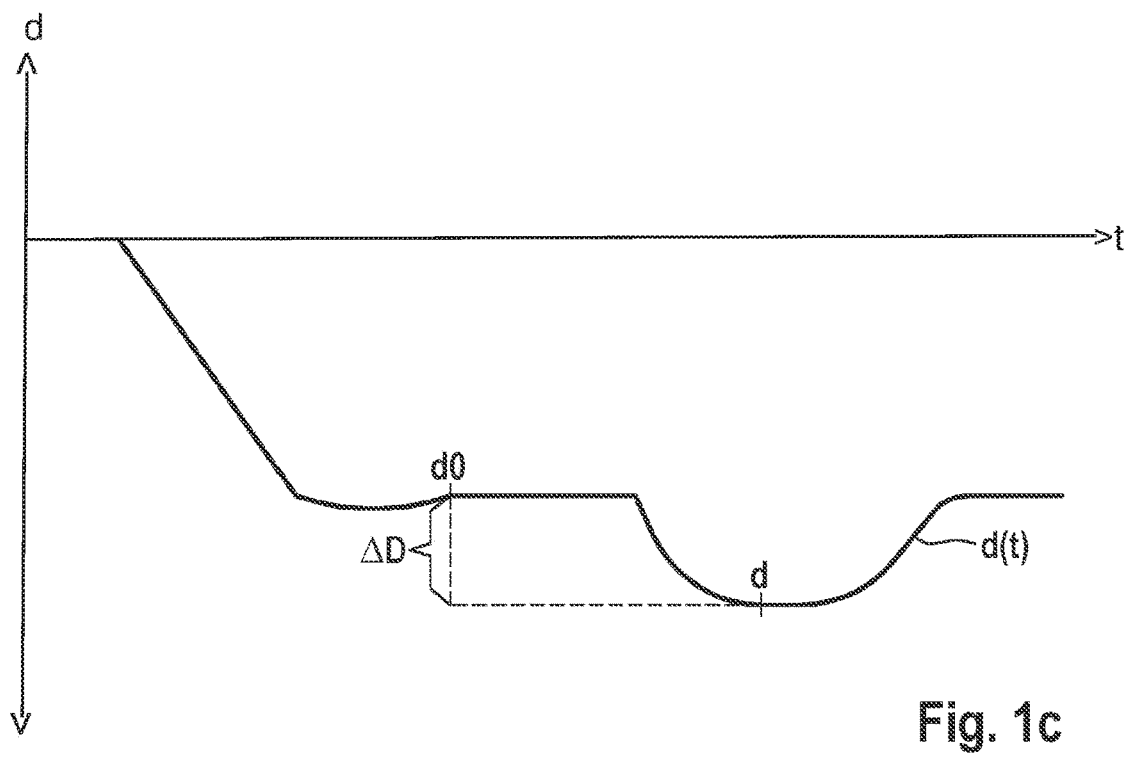

FIGS. 1a through 1c show a flow chart and coordinate systems for explaining a first specific embodiment of the method for carrying out or boosting an autonomous or partially autonomous brake pressure buildup in a braking system with the aid of an active brake booster.

The active brake booster used for carrying out the method may be understood to be a brake booster, with the aid of which an autonomous brake pressure buildup in at least one wheel brake cylinder of the respective braking system may be effectuated. The autonomous brake pressure buildup may also be referred to as an automatic brake pressure buildup, a power braking and/or a brake pressure buildup without actuation of a brake pedal of the respective braking system by a driver. It is pointed out that the autonomous brake pressure buildup takes place without initiation of a driver braking force in a main brake cylinder of the braking system and/or in the at least one wheel brake cylinder connected thereto. The autonomous brake pressure buildup is therefore (generally) not requested by the driver but instead by an automatic vehicular system/a driver assistance system (for example, an adaptive cruise control system (ACC) or a distance control system) and/or an emergency braking system (for example, an automatic emergency braking system (AEB)). The force/energy required for a brake pressure buildup in the at least one wheel brake cylinder may be exerted exclusively by the active brake booster during the autonomous or partially autonomous brake pressure buildup.

The active brake booster may be, for example, an electromechanical brake booster. However, the implementability of the method is not limited to a certain type of brake booster or to a certain type of an electromechanical brake booster. Furthermore, it is pointed out that the active brake booster may be situated in a plurality of different braking systems.

Options for use of the active brake booster, such as, for example, an electromechanical brake booster for carrying out or boosting the autonomous or partially autonomous brake pressure buildup are known and therefore will not be described further here. However, the brake pedal of the braking system equipped with the active brake booster is generally connected to the active brake booster in such a way that the corresponding operation of the active brake booster triggers a pedal movement of the brake pedal (like/similar to an actuation of the brake pedal by the driver). However, an object nearby may sometimes interfere with this pedal movement. For example, the object may extend into a gap between the brake pedal and an adjacent vehicle wall component. This may trigger a force acting in a direction opposite the movement of the pedal, often effectuating a tensile force $F_D$ on at least one component of the active brake booster, in particular on a driver brake force transfer component of the active brake booster. Tensile force $F_D$ may cause a (slight) deformation of the active brake booster at an early point in time, i.e., before or at the start of a brake pedal blockage. (It is pointed out that the term "deformation" used here and below is not to be understood as plastic deformation or damage to the active brake booster but instead is merely elastic deformation, i.e., a slight separation of a few components of the active brake booster from one another.)

In a method step S1, at least one deformation variable ΔD is ascertained with respect to a deformation of the active brake booster and/or a tensile force $F_D$ exerted on a brake pedal of the braking system and effectuating the deformation at least during the autonomous or partially autonomous brake pressure buildup carried out with the aid of the active brake booster. Examples of the at least one deformation variable ΔD are described in greater detail below.

In a method step S2, taking into account the at least one deformation variable ΔD, it is established whether there is a brake pedal blockage. As already explained above, there is a relationship between the occurrence of a deformation of the active brake booster, which is reproducible with the aid of the at least one deformation variable ΔD and a brake pedal blockage. The establishment as to whether there is a brake pedal blockage may thus be carried out reliably in method step S2.

If it is found that there is a brake pedal blockage, a method step S3 is carried out. In method step S3, a warning display device is optionally activated, a warning sound output device is activated and/or the active brake booster is activated in such a way that the active brake booster is controlled into a safety mode at least for a predefined first time interval (out of its prevailing mode) or is interrupted in its operation at least for a predefined second time interval. For example, the active brake booster (at least for the predefined first time interval) is controlled into the safety mode by reducing a rotational speed of a motor of the active brake booster, a predefined maximum rotation angle of the motor of the active brake booster, a predefined maximum adjustment travel of a booster transfer component (for transferring a booster force of the active brake booster) and/or a booster force (with respect to the prevailing mode) exerted by the active brake booster (to effectuate the autonomous or partially autonomous brake pressure buildup). Alternatively, reversal of the active brake booster (at least partially) may also take place in method step S3.

However, if it is found that there is no brake pedal blockage, then the prevailing operation of the active brake booster may be continued undisturbed (at the same rotational speed, same maximum rotation angle, same maximum adjustment travel and/or same booster force). Alternatively, if it is found that there is no brake pedal blockage, operation of the active brake booster may be further boosted (by increasing the rotational speed, the maximum rotation angle, the maximum adjustment travel and/or the booster force).

The brake pedal blockage, which might possibly be present, may be detected at an early point in time with the aid of method steps S1 and S2. Furthermore, there may be a targeted response to the brake pedal blockage detected at an early point in time with the aid of method step S3. For example, the driver who has been alerted by the warning display device and/or the warning sound output device may quickly remove the interfering object, for example, his foot. Likewise, operation of the active brake booster may be restricted or continued free of risk thanks to control of the active brake booster into its safety mode. A good safety standard may also be ensured in such a situation by termination of the operation of the active brake booster.

It is therefore possible, by carrying out method steps S1 through S3, to prevent hard contact from occurring between the brake pedal and the interfering object. In particular, a hard stop of the brake pedal against the object, jamming of the object between the brake pedal and the adjacent vehicle wall component and/or squeezing of the object may be prevented promptly with the aid of method steps S1 and S3. Damage to the object or injury of the driver is thus reliably preventable. It is likewise possible to ensure that tensile force $F_D$ introduced into the braking system, in particular into the active brake booster, is not excessively high. Therefore, damage to/breakage of a component of the braking system and/or of the active brake booster due to an excessively high tensile force $F_D$ in carrying out method steps S1 through S3 need not be feared. Method steps S1 through S3 thus create a good safety standard for vehicle occupants and a low risk of damage to components of the braking system, in particular to components of the active brake booster.

Method steps S1 and S2 are carried out at least once during the autonomous or partially autonomous brake pressure buildup effectuated with the aid of the active brake booster. For example, method steps S1 and S2 may be repeated continuously at a predefined frequency during the autonomous or partially autonomous brake pressure buildup.

In an optional method step S4, at least one valve of the braking system and/or at least one pump of the braking system may be operated in such a way that the autonomous brake pressure buildup is boosted with the aid of the at least one valve and/or the at least one pump (at least for the predefined first time interval) or continued (at least for the predefined second time interval) if (in method step S3) the active brake booster is controlled into the safety mode (at least for the predefined first time interval) or is interrupted during its operation (at least for the predefined second time interval). The operation of the at least one valve and/or the at least one pump triggered with the aid of method step S4 generally does not trigger any pedal movement or hardly any pedal movement of the brake pedal. Thus, termination of the active brake booster or control of the active brake booster into the safety mode may be compensated for at least briefly with the aid of the operation of the at least one valve and/or the at least one pump.

In the specific embodiment of FIGS. 1a through 1c, at least one temporal change $\Delta D$ of a differential travel d between a pedal force transfer component situated on the brake pedal and a booster force transfer component situated in the active brake booster is ascertained as the at least one deformation variable $\Delta D$ and taken into account in method step S2. The temporal change $\Delta D$ of differential travel d may be a derivation of differential travel d or a difference between two differential travels d and d0 ascertained one after the other (at a predefined frequency). Ascertainment of differential travel d may be a measurement (for example, with the aid of a differential travel sensor), an estimate or a derivation.

Using the temporal change $\Delta D$ of differential travel d as the at least one deformation variable $\Delta D$ permits a reliable deformation measurement on the active brake booster, which gives an indication of the brake pedal blocking, which may be present at an early point in time. Even a slight divergence of the pedal force transfer component and the booster force transfer component is detectable in this case even before the actual start of the brake pedal blockage.

Differential travel d occurring/ascertained during an autonomous or partially autonomous brake pressure buildup is sometimes impaired due to manufacturing tolerances, temperature dependences, elasticities and/or offsets in the sensor signals. Due to the temporal change $\Delta D$ of differential travel d being ascertained as at least one deformation variable $\Delta D$, however, these impairments are reliably deducible.

In particular, in the specific embodiment described here, differential travel d is determined by taking into account a rotation angle $\theta$ of the motor of the active brake booster, as measured by a rotation angle sensor, and a rod travel $x_1$ of the pedal force transfer component configured as an input rod and measured by a rod travel sensor. A position of the booster force transfer component, for example, an adjustment travel $x_2$ of a valve body and/or of a boost body may be derived according to equation 1 from rotation angle $\theta$ of the motor of the active brake booster, as:

$$x_2 = i*\theta, \qquad \text{Equation 1}$$

where i is a gear ratio of the active brake booster.

Differential travel d is defined according to equation 2 as:

$$d = x_2 - x_1 \qquad \text{Equation 2}$$

However, it is pointed out that the use of equations 1 and 2 for carrying out method step S1 is to be interpreted only as an example. For example, at least one temporal change of a differential travel variable corresponding to differential travel d may be ascertained as the at least one deformation variable $\Delta D$ and taken into account. The at least one differential travel variable may be estimated or calculated by using at least one variable measured with the aid of a sensor. At least one differential travel variable may be ascertained in particular without (directly) ascertaining a position of the driver brake force transfer component and/or a position of the booster force transfer component.

A time curve f(t) of a differential travel d occurring on the active brake booster is represented with the aid of the coordinate system of FIG. 1b. Time axis t is an abscissa of the coordinate system in FIG. 1b. The respective differential travel d is shown as the ordinate of the coordinate system in FIG. 1b. FIG. 1c shows an enlarged detail of the coordinate system of FIG. 1b.

The taken up brake pressure buildup is begun at time t1. (The brake pedal is not actuated by the driver at time t1.) The brake pressure increase in the at least one wheel brake cylinder of the braking system is effectuated exclusively by the active brake booster, for example. The active brake booster therefore adjusts a booster force transfer component, for example, a boost body and/or a valve body and indirectly at least one adjustable piston of the cooperating main brake cylinder with the aid of its booster force, starting at time t1.

Between times t1 and t2, a previously open gap is first closed between the booster force transfer component and the driver braking force transfer component (for example, an input rod). During the closing of the gap, the driver braking force transfer component and thus also the brake pedal remain in the starting position. Therefore, differential travel d between times t1 and t2 increases at a constant slope. From time t2 the brake pedal is also adjusted by the operation of the active brake booster. Since between times t2 and t3 the pedal movement is not hindered by any object but instead differential travel d remains constant (idealized).

From point in time t3 the brake pedal is blocked. For example, this may be attributed to an object protruding into the gap between the brake pedal and the adjacent vehicle wall component. The blockage of the brake pedal causes a comparatively great tensile force $F_D$ to counteract the joint adjustment movement of the driver brake force transfer component (together with the booster force transfer component). Due to an elasticity of at least a few components of the active brake booster, this causes a sudden and intense increase in differential travel d at time t3. The increase/rise of differential travel d at time t3 may be proportional to tensile force $F_D$ in particular.

However, as is apparent on the basis of FIG. 1c, the brake pedal blockage is detectable at an early point in time with the aid of deformation variable ΔD calculated according to equation 3:

$$\Delta D = d - d0 \qquad \text{Equation 3}$$

The equation 3 thus permits a detection function, which detects tensile force $F_D$ at an early point in time. In particular, it is then possible with the aid of method step S3, to respond in a suitable manner even before the occurrence of injuries or property damage. The brake pedal blockage may be canceled as soon as deformation variable ΔD is reduced.

From time t4 the autonomous brake pressure buildup in the at least one wheel brake cylinder is reduced slowly. This takes place by reversing the active brake booster, which is why a constant differential travel d occurs again between times t4 and t5 and a steadily declining differential travel d occurs between times t5 and t6. From time t6 the autonomous brake pressure buildup is terminated.

Figure 2:
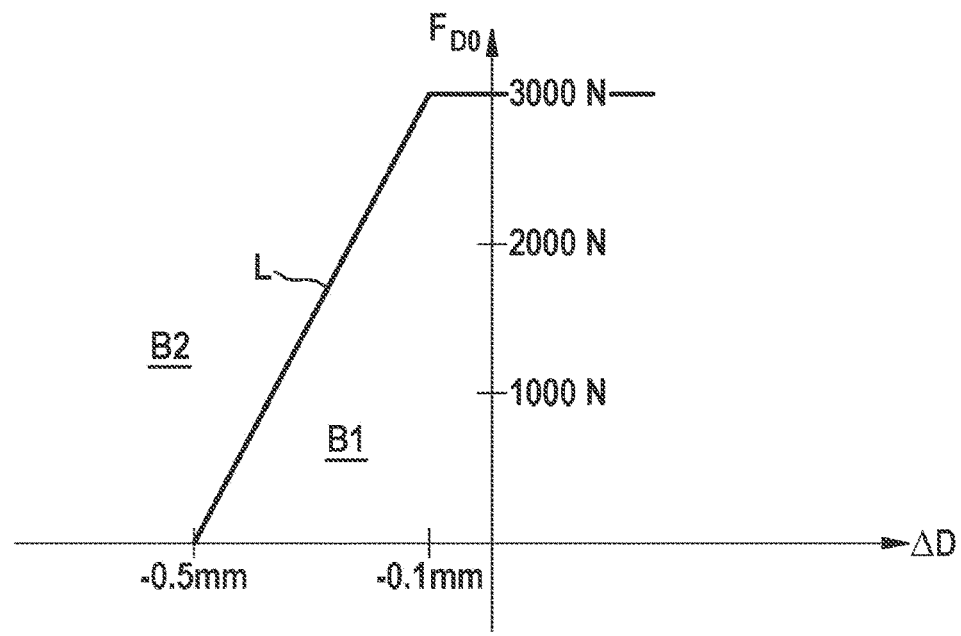
FIG. 2 shows a coordinate system for explaining a second specific embodiment of the method for carrying out or boosting an autonomous or partially autonomous brake pressure buildup in a braking system with the aid of an active brake booster.

FIG. 2 shows a coordinate system for explaining a second specific embodiment of the method for carrying out or boosting an autonomous or partially autonomous brake pressure buildup in a braking system with the aid of an active brake booster.

In the method described here (with respect to its implementability, reference is made to the preceding discussion), the question of whether a brake pedal blockage has occurred is defined by taking into account a comparison of at least tensile force $F_D$ as the at least one deformation variable $F_D$ having at least one predefined normal value range. If it is established that tensile force $F_D$ is outside of the at least one normal value range, then the presence of a brake pedal block is detected. Method step S3 described above may subsequently be carried out (possibly together with method step S4).

Furthermore, the at least one normal value range is established by taking into account at least differential travel d and/or the temporal change ΔD of differential travel d. As an alternative to this method, however, step S2 may also be carried out with a fixedly predefined normal value range (regardless of differential travel d and the temporal change ΔD of differential travel d).

In a substep of method step S1, tensile force $F_D$ exerted on the brake pedal is ascertained. Ascertaining tensile force $F_D$ may also be understood to be a measurement, an estimation and/or a calculation. (It is pointed out here that tensile force $F_D$ is not to be understood as an actuating force exerted on the brake pedal for requesting a brake pressure buildup in the at least one wheel brake cylinder. Tensile force $F_D$ is generally directed instead against the pedal movement/joint adjustment movement of the brake pedal during the autonomous or partially autonomous brake pressure buildup in the at least one wheel brake cylinder and takes place unintentionally, for example, due to an object extending into the space between the brake pedal and the adjacent vehicle wall component.)

In particular, in the specific embodiment described here, the tensile force is established by taking into account at least booster force Fm exerted by the active brake booster, a compressive force Fp exerted on at least one adjustable piston of the main brake cylinder of the braking system (by a main brake cylinder pressure p prevailing in the main brake cylinder), a restoring force Fr of at least one spring of the braking system (specifically of the active brake booster and/or of the main brake cylinder) and/or a (linear) motor acceleration a of a motor of the active brake booster. For example, tensile force $F_D$ may be calculated according to equation 4:

$$F_D = Fm - Fp - Fr - m^* a, \qquad \text{Equation 4}$$

where m is an effective mass of the motor of the active brake booster. Effective mass m of the motor is obtained from the inertia J of the motor and the gear ratio i of the active brake booster according to equation 5:

$$m = J^* i \qquad \text{Equation 5}$$

The (linear) motor acceleration a may be derived via the gear ratio i from a rotational acceleration ω' of the motor according to the equation 6:

$$a = \omega'^* i \qquad \text{Equation 6}$$

Booster force Fm of the active brake booster is often calculated with the aid of equation 7:

$$Fm = M^* i^* \eta_1, \qquad \text{Equation 7}$$

where M is a motor torque of the motor of the active brake booster, i is the gear ratio and $\eta_1$ is the efficiency of the active brake booster.

To calculate compressive force Fp exerted by main brake cylinder pressure p on the at least one adjustable piston of the main brake cylinder, the equation 8 may be used:

$$Fp = p^* A^* \eta_2, \qquad \text{Equation 8}$$

where $\eta_2$ indicates an efficiency of the main brake cylinder. Surface A, with which the at least one adjustable piston brakes into the main brake cylinder is obtained from a diameter δ of the main brake cylinder using the equation 9:

$$A = \pi^* (\delta^2 / 4) \qquad \text{Equation 9}$$

Restoring force Fr is defined in the equation 10 as the sum of a first restoring force F1 of the springs/restoring springs of the main brake cylinder and a second restoring force F2 of the at least one spring/restoring spring of the active brake booster:

$$Fr = F1 + F2 \qquad \text{Equation 10}$$

A derivation/calculation of first restoring force F1 is possible according to the equation 11:

$$F1=(x_2-x_0)*(\kappa/2)+F_{01} \text{ if } x_2>x_0 \text{ or}$$

$$F1=x_2*\kappa+F_{02} \text{ if } x_2 \leq x_0, \quad \text{Equation 11}$$

where $x_2$ is defined above. Variable $x_0$ indicates an average adjustment travel of the at least one adjustable piston of the main brake cylinder and is defined according to the equation 12 as:

$$x_0=(F_{01}-F_{02})/\kappa, \quad \text{Equation 12}$$

where it is assumed that the main brake cylinder which is configured as a tandem main brake cylinder has two serial springs having equal constants $\kappa$. As an example, however, prestressing forces $F_{01}$ and $F_{02}$ of the two springs of the main brake cylinder are different.

For calculating/deriving the second restoring force F2, the equation 13 is given here as an example:

$$F2=\Phi+f*x_2 \quad \text{Equation 13}$$

Prestress $\Phi$ and spring stiffness f of the restoring spring are relatively freely selectable.

The equations 4 through 13 offer a simple dynamic model for calculating tensile force $F_D$. Tensile force $F_D$ is generally oriented toward the driver and is defined as positive.

In particular, in the event of a brake pedal blockage or a pull of the brake pedal in the direction of the driver, the (positive) tensile force $F_D$ is often relatively large. In particular when the brake pedal collides very rapidly with an object, a force gradient of tensile force $F_D$ increases sharply.

Differential travel d and/or the temporal change $\Delta D$ of differential travel d may be ascertained in another substep of method step S1 according to the specific embodiment described above. In a coordinate system of FIG. 2, the establishment of the at least one normal value range with the aid of a variably predefinable comparative tensile force $F_{D0}$ is represented graphically, taking into account the temporal change $\Delta D$ of differential travel d. An abscissa of the coordinate system of FIG. 2 shows the temporal change $\Delta D$ of differential travel d. Comparative tensile force $F_{D0}$, which may be used as a threshold value, is represented with the aid of the ordinate.

A brake pedal blockage (pedal blockade) is detected in method step S2, when tensile force $F_D$ exceeds comparative tensile force $F_{D0}$, which depends on the temporal change $\Delta D$ of differential travel d. A line L separates ranges B1 and B2, whereby a lack of a brake pedal blockage is detected in range B1, and a presence of a brake pedal blockage is detected in range B2. The brake pedal blockage (pedal blockade) may be canceled as soon as tensile force $F_D$ drops back below comparative tensile force $F_{D0}$, which depends on the temporal change $\Delta D$ of differential travel d.

As an alternative or in addition to the comparison of tensile force $F_D$ described above, at least one other tensile force variable which correlates with tensile force $F_D$ may also be compared with at least one suitably selected or fixedly predefined normal value range. The at least one tensile force variable may also be obtained by a measurement, an estimate and/or calculation. (The at least one tensile force variable is understood to include at least one other variable which indirectly reflects tensile force $F_D$ exerted on the brake pedal.)

Figure 3:
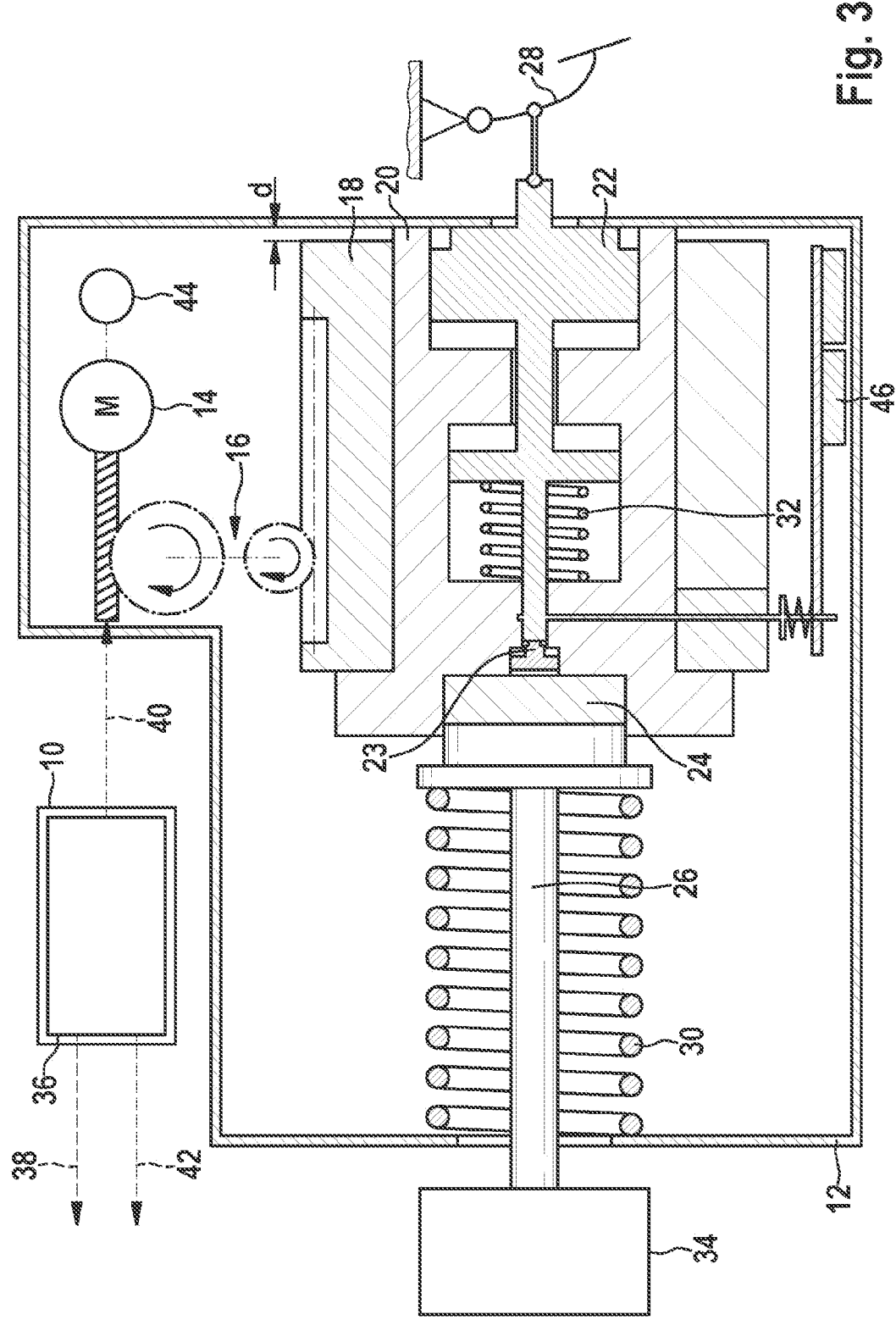
FIG. 3 shows a schematic diagram of one specific embodiment of the sensor device.

FIG. 3 shows a schematic diagram of one specific embodiment of the sensor device.

Sensor device 10 schematically shown in FIG. 3 is situated in/on a braking system, including an electromechanical brake booster 12. However, it is pointed out that electromechanical brake booster 12 schematically shown in FIG. 2 is only one possible example of an active brake booster suitable for cooperating with sensor device 10. Likewise, the design of electromechanical brake booster 12 shown graphically in FIG. 2 including a motor 14, a thread 16, a boost body 18, a valve body 20, an input rod 22 (including a pastille 23), a reactive disk 24 and an output rod 26, is to be understood merely as an example.

Sensor device 10 illustrated in FIG. 3 or a modification thereof may also cooperate with a brake booster of a different design. For example, a low pressure or vacuum brake booster may also be used as the active brake booster. The low pressure or vacuum brake booster may be equipped with additional valves in such a way that the booster force exerted by it is electrically adjustable regardless of the position of a brake pedal 28. Thus, an autonomous brake pressure buildup may also be carried out with the aid of the low pressure or vacuum brake booster.

A brake pedal blockage may be detected/determined on (almost) each one of the braking systems equipped with brake pedal 28 and active brake booster 12 with the aid of sensor device 10 or a modification thereof. Sensor device 10 or its modification may thus be used for a plurality of different types of braking systems.

For an autonomous or partially autonomous brake pressure buildup, motor 14 moves booster body 18 via gear 16, so that valve body 20 is driven. During the autonomous or partially autonomous brake pressure buildup, a booster force of active brake booster 12 is exerted on the adjustable output rod 26 (deforming a first restoring spring 30) and at least one adjustable piston (not shown) of a main brake cylinder 34 of the braking system, in such a way that the main brake cylinder pressure prevailing in the respective main brake cylinder 34 is increased. By increasing the main brake cylinder pressure, an increase in the brake pressure prevailing in the at least one attached wheel brake cylinder may be achieved.

As soon as a previously open gap is closed due to the adjustment of valve body 20 effectuated by the motor, valve body 20 also pulls input rod 22 (ideally at a constant differential travel d and without compressing a second restoring spring 32) and in this way induces the pedal movement of the brake pedal 28 already described above. Brake pedal 28 is often adjusted thereby in such a way that a gap between brake pedal 28 and an adjacent vehicle wall component (not shown) is reduced/closed. Jamming of at least one object in the reduced/closed gap is also preventable at an early point in time by operation of sensor device 10.

Sensor device 10 has an electronic device 36, which, at least during the autonomous or partially autonomous brake pressure buildup carried out or boosted with the aid of active brake booster 12, is configured to output at least one activation signal 38 to a warning display device (not shown) and/or to a warning sound output device (not shown) and/or at least one first control signal 40 to active brake booster 12, which is controllable with the aid of the at least one first control signal 40 for at least a predefined first time interval into a safety mode or may be interrupted during its operation for at least a predefined second time interval, taking into account at least one deformation variable $\Delta D$ or $F_D$, established by sensor device 10 itself or externally provided, with respect to a deformation of active brake booster 12 and/or a tensile force $F_D$ exerted on the brake pedal 28 of the braking system and effectuating the deformation. If, with the aid of electronic device 36, the at least one first control signal 40 is outputtable to active brake booster 12, electronic device 36 may optionally also be configured to output at least one second control signal 42 to at least one valve (not shown) of the braking system and/or at least one pump (not shown) of the braking system during output of the at least one first control signal 40. In this case, the at least one valve and/or the at least one pump may be activatable with the aid of the at least one second control signal 42 in such a way that the autonomous brake pressure buildup may be boosted with the aid of the at least one valve and/or the at least one pump, at least for the predefined first time interval or may be continued at least for the predefined second time interval.

Sensor device 10 also ensures the advantages described above, such as robustness in detection of a possible brake pedal blockage, for example. However, these advantages will not be enumerated again here.

For example, electronic device 36 is configured to output at least the at least one activation signal 38 and/or the at least one first control signal 40, taking into account at least one temporal change ΔD of a differential travel d between input rod 22 (as a pedal force transfer component) and the valve body (as a booster force transfer component) as the at least one deformation variable ΔD. Specifically, the electronic device may therefore analyze a rotation angle of motor 14 of active brake booster 12, measured by a rotation angle sensor 44, and a rod travel of input rod 22, measured by a rod travel sensor 46, according to the equations 1 through 3 specified above.

Alternatively or additionally, electronic device 36 may also be configured to output at least the at least one activation signal 38 and/or the at least one first control signal 40, taking into account a comparison of at least tensile force $F_D$ as the at least one deformation variable $F_D$ having at least one predefined normal value range. Tensile force $F_D$ may be ascertained in particular by using the equations and variables specified above. The at least one normal value range is also optionally establishable with the aid of electronic device 36, taking into account at least differential travel d and/or the temporal change ΔD of a differential travel d.

Sensor device 10 may also be identifiable as a control unit (at least for the autonomous or partially autonomous brake booster). In the example in FIG. 3, control unit 10 is configured as a unit that may be situated externally from the autonomous or partially autonomous brake booster 12. However, control unit 10 may also be a subunit of autonomous or partially autonomous brake booster 12.

What is claimed is:

1. A sensor device for a braking system including an active brake booster, which is configured for carrying out or boosting an autonomous or partially autonomous brake pressure buildup, comprising:
    an electronic device, which, at least during the autonomous or partially autonomous brake pressure buildup carried out or boosted with the aid of the active brake booster, is configured taking into account at least one deformation variable, established by the sensor device or provided externally, with respect to a deformation of the active brake booster and/or a tensile force exerted on a brake pedal of the braking system and effectuating the deformation, to output at least one first control signal to the active brake booster, wherein the at least one first control signal controls the active brake booster into a safety mode at least for a predefined first time interval or interrupts an operation of the active brake booster for at least one predefined second time interval, the safety mode being implemented by reducing at least one of:
    a rotational speed of a motor of the active brake booster,
    a predefined maximum rotation angle of the motor of the active brake booster,
    a predefined maximum adjustment travel of a booster transfer component for transferring a booster force of the brake booster, and
    a booster force exerted by the brake booster to effectuate the autonomous or partially autonomous brake pressure buildup;
    wherein the tensile force is effected by an interfering object disposed in a gap between the brake pedal and an adjacent vehicle wall component,
    wherein the electronic device is additionally configured to output at least one second control signal to at least one valve of the braking system and/or at least one pump of the braking system, the at least one second control signal being output during the safety mode, the at least one valve and/or the at least one pump being activatable with the at least one second control signal so that the autonomous brake pressure buildup is boostable with the at least one valve and/or the at least one pump, at least for the predefined first time interval, or is continuable at least for the predefined second time interval.

2. The sensor device of claim 1, wherein the tensile force depends on an effective mass of a motor of the active brake booster and on a linear acceleration of the motor.

3. The sensor device of claim 2, wherein the effective mass depends on an inertia of the motor and a gear ratio of the active brake booster, and the linear acceleration depends on the gear ratio and a rotational acceleration of the motor.

4. The sensor device of claim 1, wherein the electronic device is configured to output at least one activation signal and/or the at least one first control signal, taking into account a temporal change of a differential travel between a pedal force transfer component situated on the brake pedal and a booster force transfer component situated in or on the active brake booster as the at least one deformation variable, the temporal change corresponding to a change in the differential travel as a function of time, and the at least one activation signal being output to a warning display device and/or a warning sound output device.

5. The sensor device of claim 4, wherein the electronic device is configured to establish the differential travel taking into account a rotation angle of a motor of the active brake booster as measured by a rotation angle sensor, and a rod travel measured by a rod travel sensor of the pedal force transfer component which is designed as an input rod.

6. The sensor device of claim 4, wherein the electronic device is configured to output at least the at least one activation signal and/or the at least one first control signal taking into account a comparison of at least the tensile force as the at least one deformation variable with at least one predefined normal value range.

7. The sensor device of claim 6, wherein the electronic device is configured to establish the at least one normal value range taking into account at least the differential travel and/or the temporal change of the differential travel.

8. The sensor device of claim 6, wherein the electronic device is configured to establish the tensile force taking into account at least one booster force exerted by the active brake booster, a compressive force exerted on at least one adjustable piston of a main brake cylinder of the braking system, a restoring force of at least one spring of the braking system and/or a motor acceleration of a motor of the active brake booster.

9. An active brake booster for a braking system for carrying out or boosting an autonomous or partially autonomous brake pressure buildup, comprising:
- a sensor device, wherein the braking system includes the active brake booster, which is configured for carrying out or boosting an autonomous or partially autonomous brake pressure buildup, including:
- an electronic device, which, at least during the autonomous or partially autonomous brake pressure buildup carried out or boosted with the aid of the active brake booster, is configured taking into account at least one deformation variable, established by the sensor device or provided externally, with respect to a deformation of the active brake booster and/or a tensile force exerted on a brake pedal of the braking system and effectuating the deformation, to output at least one first control signal to the active brake booster, wherein the at least one first control signal controls the active brake booster into a safety mode at least for a predefined first time interval or interrupts an operation of the active brake booster for at least one predefined second time interval, the safety mode being implemented by reducing at least one of:
- a rotational speed of a motor of the active brake booster,
- a predefined maximum rotation angle of the motor of the active brake booster,
- a predefined maximum adjustment travel of a booster transfer component for transferring a booster force of the brake booster, and
- a booster force exerted by the brake booster to effectuate the autonomous or partially autonomous brake pressure buildup;
- wherein the tensile force is effected by an interfering object disposed in a gap between the brake pedal and an adjacent vehicle wall component,
- wherein the electronic device is additionally configured to output at least one second control signal to at least one valve of the braking system and/or at least one pump of the braking system, the at least one second control signal being output during the safety mode, the at least one valve and/or the at least one pump being activatable with the at least one second control signal so that the autonomous brake pressure buildup is boostable with the at least one valve and/or the at least one pump, at least for the predefined first time interval, or is continuable at least for the predefined second time interval.

10. The active brake booster of claim 9, wherein the tensile force depends on an effective mass of a motor of the active brake booster and on a linear acceleration of the motor.

11. The active brake booster of claim 10, wherein the effective mass depends on an inertia of the motor and a gear ratio of the active brake booster, and the linear acceleration depends on the gear ratio and a rotational acceleration of the motor.

12. A method for carrying out or boosting an autonomous or partially autonomous brake pressure buildup in a braking system with an active brake booster, the method comprising:
- ascertaining at least one deformation variable with respect to a deformation of the active brake booster and/or a tensile force, which is exerted on a brake pedal of the braking system and which induces the deformation at least during the autonomous or partially autonomous brake pressure buildup carried out or boosted with the aid of the active brake booster, wherein the tensile force is effected by an interfering object disposed in a gap between the brake pedal and an adjacent vehicle wall component;
- determining whether a brake pedal blockage is present, taking into account the at least one deformation variable;
- activating, if a brake pedal blockage is detected, the active brake booster so that the active brake booster is controlled at least for a predefined first time interval into a safety mode or the active brake booster operation is interrupted at least for a predefined second time interval, the safety mode being implemented by reducing at least one of:
- a rotational speed of a motor of the active brake booster,
- a predefined maximum rotation angle of the motor of the active brake booster,
- a predefined maximum adjustment travel of a booster transfer component for transferring a booster force of the brake booster, and
- a booster force exerted by the brake booster to effectuate the autonomous or partially autonomous brake pressure buildup; and
- during the active brake booster being controlled into the safety mode for the predefined first time interval or the active brake booster operation being interrupted at least for the predefined second time interval, at least one valve of the braking system and/or at least one pump of the braking system is/are operated so that the autonomous brake pressure buildup with the at least one valve and/or the at least one pump is boosted at least for the predefined first time interval or is continued at least for the predefined second time interval.

13. The method of claim 12, wherein the tensile force depends on an effective mass of a motor of the active brake booster and on a linear acceleration of the motor.

14. The method of claim 13, wherein the effective mass depends on an inertia of the motor and a gear ratio of the active brake booster, and the linear acceleration depends on the gear ratio and a rotational acceleration of the motor.

15. The method of claim 12, wherein a temporal change of a differential travel between a pedal force transfer component situated on the brake pedal and a booster force transfer component situated in or on the active brake booster is ascertained as the at least one deformation variable and taken into account, the temporal change corresponding to a change in the differential travel as a function of time.

16. The method of claim 15, wherein the differential travel is established by taking into account a rotation angle of the motor of the active brake booster, measured by a rotation angle sensor, and taking into account a rod travel of the pedal force transfer component, configured as an input rod, measured by a rod travel sensor.

17. The method of claim 15, wherein the determination of whether a brake pedal blockage is present occurs by taking into account a comparison of at least the tensile force as the at least one deformation variable with at least one predefined normal value range.

18. The method of claim 17, wherein the at least one normal value range is established by taking into account at least the differential travel and/or the temporal change of the differential travel.

19. The method of claim 17, wherein the tensile force is established by taking into account at least one booster force exerted by the active brake booster, one compressive force exerted on the at least one adjustable piston of a main brake cylinder of the braking system, a restoring force of at least one spring of the braking system and/or a motor acceleration of a motor of the active brake booster.

* * * * *